United States Patent [19]
Camara et al.

[11] Patent Number: 6,129,786
[45] Date of Patent: Oct. 10, 2000

[54] COMPOSITE PIGMENTS BASED ON POLYALKYLENEPOLYAMINE-MODIFIED NANOPARTICULATE METAL OXIDES AND ANIONIC DYES

[75] Inventors: Boubacar Camara, Auenwald; Manfred Patsch, Wachenheim; Ulrich Steuerle, Heidelberg; Jürgen Romeis, Ludwigshafen, all of Germany

[73] Assignee: BASF Aktiengesellschaft, Ludwigshafen, Germany

[21] Appl. No.: 09/081,019

[22] Filed: May 19, 1998

[30] Foreign Application Priority Data

May 28, 1997 [DE] Germany .......................... 197 22 388

[51] Int. Cl.[7] .............................. C09C 1/00; C09C 1/28; C09C 1/36; C09C 1/40
[52] U.S. Cl. ........................ 106/499; 106/404; 106/410; 106/436; 106/447; 106/448; 106/450; 106/482; 106/491; 106/494; 106/495; 106/496; 106/497; 106/498; 106/506
[58] Field of Search ..................................... 106/491, 499, 106/506, 404, 410, 436, 447, 448, 450, 482, 494, 495, 496, 497, 498

[56] References Cited

U.S. PATENT DOCUMENTS

| | | | |
|---|---|---|---|
| 4,569,694 | 2/1986 | Spitz et al. | 524/2 |
| 4,576,888 | 3/1986 | Miyakawa et al. | 430/106 |
| 4,877,451 | 10/1989 | Winnik et al. | 106/490 |
| 5,413,632 | 5/1995 | Vermoortele et al. | 106/493 |
| 5,683,501 | 11/1997 | Tomihisa et al. | 106/491 |

FOREIGN PATENT DOCUMENTS

| | | |
|---|---|---|
| 552308 | 1/1958 | Canada .................................. 106/491 |
| 0 140 688 0 | 5/1985 | European Pat. Off. . |
| 0 239 079 A2 | 9/1987 | European Pat. Off. . |
| 196 07 641 A1 | 9/1997 | Germany . |
| 2 113 704 | 8/1983 | United Kingdom . |
| WO 95/35165 | 12/1995 | WIPO . |

OTHER PUBLICATIONS

European Patent Abstract No. EP000292702A1, abstract of European Patent Specification No. 292,702 (Nov. 1988).
Japanese Patent Abstract No. JP406329964A, abstract of Japanese Patent Specification No. 3–29964 (Nov. 1994).
Japanese Patent Abstract No. JP410060352A, abstract of Japanese Patent Specification No. 10–060352 (Mar. 1998).
R. Ledger, et al., "Preparation and Analysis of Reactive Blue 2 Bonded to Silica Via Variable Spacer Groups", Journal of Chromatography, Elsevier Science Publishers B.V., 1984, pp. 175–183 (no month).
F. M. Winnik, et al., "New Water–Dispersible Silica–Based Pigments: Synthesis and Characterization", Dyes and Pigments 14, 1990, pp. 101–112 (no month).
W. Stoeber, et al., "Controlled Growth of Monodisperse Silica Spheres in the Micron Size Range[1]", Journal of Colloid and Interface Science 26, 1968, pp. 62–89 (no month) .
L. Horner, et al., "Chemistry at Rigid Surfaces", Z. Naturforschung, 42(b), 1987, pp. 643–660 (no month).

*Primary Examiner*—Anthony Green
*Attorney, Agent, or Firm*—Oblon, Spivak, McClelland, Maier & Neustadt, P.C.

[57] ABSTRACT

Composite pigments based on nanoparticulate metal oxides modified by crosslinked or uncrosslinked polyalkylenepolyamine and anionic dyes are useful for coloring paints, inks, plastic, paper, wood, leather and textile materials.

15 Claims, No Drawings

COMPOSITE PIGMENTS BASED ON POLYALKYLENEPOLYAMINE-MODIFIED NANOPARTICULATE METAL OXIDES AND ANIONIC DYES

The present invention relates to novel composite pigments comprising nanoparticulate metal oxides modified by crosslinked or uncrosslinked polyalkylenepolyamine and anionic dyes.

This invention further relates to the production of these pigments and to their use for coloring paints, inks, plastic, paper, wood, leather and textile materials.

The invention also relates to metal oxide nanoparticles which are modified by crosslinked or uncrosslinked polyalkylenepolyamine and which are intermediates for the composite pigments and to the production thereof.

Composite pigments or else hybrid pigments comprising inorganic base materials and organic dyes represent a novel development in the field of colorants, designed to combine the positive properties of the two components, namely the stability and sparing solubility of the inorganic part and the color properties, eg. brilliance and color strength, of the dye.

In prior art composite pigments, the colored constituent comprises quinophthalone dyes, perylene chromophores, azo dyes or reactive dyes which are covalently bonded to the inorganic oxidic base material (especially silicon dioxide as well as aluminum oxide, titanium dioxide and zirconium dioxide) via an organic coupling agent. The coupling agents used are functionalized silanes, especially aminofunctionalized alkoxysilanes, such as 3-aminopropyltriethoxysilane, or chlorine-, methacryloyloxy- or epoxypropoxy-containing alkoxysilanes which attach to the metal oxide via the alkoxy radicals and to the dye via the additional functional groups (GB-A-2 113 704; EP-A-140 688; U.S. Pat. Nos. 4,576,888 and 4,877,451; Z. Naturforsch. 42(b), 643 (1987); J. Chromatogr. 299, 175 (1984); Dyes and Pigments 14, 101 (1990)).

Finally, WO-A-95/35165 describes solid ligands composed of $SiO_2$ particles (particle size $\geq 200$ $\mu$m) with branched polyalkylenepolyamines attached via a functionalized alkoxysilane (eg. 3-chloropropyltrimethoxysilane), which are used as complexing agents for metal ions and hence to remove metal ions, for example from water.

Similarly, EP-A-239 079 discloses materials based on $SiO_2$ particles to which branched polyethyleneimine is likewise attached via coupling agents such as functionalized alkoxysilanes or glutaric dialdehyde. These materials are used as biocatalytical supports.

It is an object of the present invention to provide novel composite pigments having advantageous application properties.

We have found that this object is achieved by composite pigments comprising nanoparticulate metal oxides modified by crosslinked or uncrosslinked polyalkylenepolyamine and anionic dyes.

The invention further provides a process for producing these composite pigments by an aqueous suspension of the metal oxide nanoparticles modified by crosslinked or uncrosslinked polyalkylenepolyamine being adjusted to a pH within the range from 3 to 6 and heated to not more than 100° C. for from 1 to 3 h, then adding an aqueous solution of the anionic dye, cooling the mixture after a reaction time of from 1 to 24 h at from 20 to 100° C. and the resulting composite pigment being isolated in a conventional manner and optionally dried and ground.

The invention additionally provides a process for producing the metal oxide nanoparticles modified by crosslinked or uncrosslinked polyalkylenepolyamine by a1) heating an aqueous suspension of the metal oxide nanoparticles together with an aqueous solution of the crosslinked or uncrosslinked polyalkylenepolyamine, or a2) heating a suspension of the metal oxide nanoparticles in water or in an inert organic solvent together with the monomeric alkyleneimine and, if desired, a crosslinker to polymerize the alkyleneimine to the polyalkylenepolyamine, or b) preparing the metal oxide nanoparticles in situ via a sol-gel process by hydrolysis of organic esters of the metal acids b1) in the presence of the crosslinked or uncrosslinked polyalkylenepolyamine, or b2) in the presence of the monomeric alkyleneimine and, if desired, a crosslinker and polymerizing the alkyleneimine to the polyalkylenepolyamine at the same time.

Lastly, the invention provides for the use of the composite pigments for coloring paints, inks, plastic, paper, wood, leather and textile materials.

The composite pigments of the invention have a base material composed of nanoparticulate metal oxide.

Suitable metal oxides include, for example, silicon dioxide, aluminum oxide, zirconium dioxide, titanium dioxide and tin dioxide, and silicon dioxide is preferred.

The average metal oxide particle size is generally within the range from 10 to 500 nm, preferably within the range from 20 to 100 nm.

Such nanoparticulate silicon dioxide can be produced by flame hydrolysis, for example, and is commercially available (eg. Aerosil®, Degussa).

The composite pigments of the invention can be produced using these materials or, as described hereinafter, silicon dioxide (or metal oxide) nanoparticles produced, in situ if desired, via a sol-gel process.

The metal oxide nanoparticles used as base material in the composite pigments of the invention are modified by a polyalkylenepolyamine, which may be crosslinked.

It is surprising that the polyalkylenepolyamine is firmly attached to the metal oxide even in the absence of known coupling agents, making it possible to use thus modified metal oxide nanoparticles as a basis for producing composite pigments which do not bleed.

Useful polyalkylenepolyamines are generally poly-$C_2$–$C_6$-alkylenepolyamines, particularly polypropyleneimines, very particularly polyethyleneimines. The polyalkylenepolyamines are preferably unsubstituted, but can also be substituted. For instance, the monomeric ethyleneimine may bear on the nitrogen atom not only hydrogen but also a hydroxyethyl, aminoethyl or N-formylaminoethyl radical and/or on the carbon atoms mutually independently identical or different radicals selected from the group consisting of hydrogen, $C_1$–$C_6$-alkyl and aryl.

Polyalkylenepolyamines of various degrees of branching and various molecular weights can be used. The proportion of secondary nitrogen atoms (2° N) is a measure of the degree of branching.

Suitable degrees of branching range, for example, from unbranched polyethyleneimines having 2° N=99% via (partially) branched polyethyleneimines through to polyethyleneimines having dendrimeric structures with 2° N=0. Preference is given to polyethyleneimines having a secondary nitrogen atom content within the range from 20 to 60%.

Suitable molecular weights range from 100 to 10,000,000, preferably from 500 to 10,000,000.

It is of particular importance that the size of the $SiO_2$ particles, for example, is influenced by the molecular weight of the polyalkylenepolyamine present in the production by the sol-gel method and can therefore be steered into whatever direction is desired. If, for example, the molecular weight of polyethyleneimine is around 2000, this generally produces $SiO_2$ primary particle sizes from about 200 to 500 nm, whereas a polyethyleneimine molecular weight of about 2,000,000 results in $SiO_2$ primary particle sizes from generally 10 to 50 nm.

The polyalkylenepolyamines used for modifying the metal oxide particles can also be crosslinked. Any known crosslinker is suitable.

Examples of suitable crosslinkers include halogen-containing crosslinkers such as (poly)alkylene polyhalides, especially 1,2-dichloroethane, and specifically epichlorohydrin and its reaction products with polyalkylene, especially polyethylene, glycols (polyalkylene glycol bisglycidyl ethers).

Further suitable bifunctional, halogen-free crosslinkers include, for example, the substances described in DE 196 07 641.2: alkylene carbonate, urea; monoethylenically unsaturated carboxylic acids, at least dibasic saturated carboxylic acids or polycarboxylic acids and their esters, amides and anhydrides; reaction products of polyether diamines, alkylenediamines, polyalkylenepolyamines, (poly)alkylene glycols and their mixtures with monoethylenically unsaturated carboxylic acids, esters, amides and anhydrides, in which case the reaction products contain at least two ethylenically unsaturated double bonds, carboxamide, carboxyl or ester groups as functional groups; at least diaziridinyl-containing reaction products of dicarboxylic esters with ethyleneimine.

The composite pigments of the invention are typically produced using a weight ratio of metal oxide:polyalkylenepolyamineo (especially $SiO_2$:polyethyleneimine) within the range from 1000:1 to 1:10, preferably within the range from 10:1 to 1:1.

The coloring constituent of the composite pigments of the invention comprises at least one anionic dye.

Any anionic dye, ie. any dye having water-solubilizing acidic groups, especially sulfo groups, is suitable. Appropriate dye classes which may be mentioned by way of example are azo dyes (direct, reactive and metallized dyes), di- and triarylmethane dyes, anthraquinone dyes (acid dyes, substantive dyes, reactive dyes), phthalocyanine dyes, nitro dyes, pyrazolone dyes, quinoline dyes, naphthol dyes and azine dyes.

The reactive dyes have particular importance for the composite pigments of the invention. Reactive dyes contain chromophores of the azo, anthraquinone, phthalocyanine, dioxazine or metallized formazan series as well as reactive groups. The reactive groups in question are generally either halogen-containing, unsaturated, usually heterocyclic radicals, for example triazyl, pyrazinyl and pyrimidinyl radicals, or sulfonyl, sulfamoyl or carbamoylalkylsulfo radicals. Preference is given to reactive groups based on mono- and dichlorotriazine and vinyl sulfone.

The anionic dye generally comprises from 5 to 40%, preferably from 20 to 30%, of the total weight of the composite pigments of the invention.

The novel composite pigments are advantageously producible according to the process of the invention by initially adjusting an aqueous suspension of the metal oxide nanoparticles modified by polyalkylenepolyamine to a pH within the range from 3 to 6 by addition of an acid such as acetic acid and heating the pH-adjusted suspension with stirring at not more than 100° C. for from 1 to 3 h, then adding an aqueous, generally 3 to 8% strength by weight solution of the anionic dye dropwise, and subsequently heating the mixture, likewise with stirring, at from 20 to 100° C. for from 1 to 24 h.

The composite pigment formed can be cooled down and conventionally filtered off, washed pH-neutral and optionally dried. Depending on the intended application (application in an aqueous medium, for example), the drying step can also be omitted. If desired, the composite pigments obtained can be additionally subjected to a grinding step.

The aqueous metal oxide suspension used is advantageously the as-modified suspension of the metal oxide nanoparticles, in which case intermediary isolation of the modified metal oxide particles can be dispensed with.

The metal oxide nanoparticles can be modified in various ways according to the invention.

When proceeding according to a variant a1), an aqueous suspension of the metal oxide nanoparticles is heated to 30 to 75° C. with stirring, then an aqueous, generally from 5 to 20% strength by weight solution of the crosslinked or uncrosslinked polyalkylenepolyamine is added dropwise and the reaction mixture is worked up in a conventional manner following a reaction time of from about 1 to 6 h at the selected temperature and cooling.

In variant a2), the polyalkylenepolyamine is not produced separately; instead, the polymerization of the alkyleneimine to form the polyalkylenepolyamine takes place in a suspension of the metal oxide nanoparticles.

If uncrosslinked polyalkylenepolyamine is desired as modifier, it is customary to charge an aqueous suspension of the metal oxide particles initially, to add the monomeric alkyleneimine with thorough stirring, to heat the mixture gradually to 30–50° C. and generally to stir it for from 1 to 7 days while gradually raising the temperature to 80–95° C. until the test for alkyleneimine is negative.

If crosslinked polyalkylenepolyamine is desired as modifier, it is preferable to charge a suspension of the metal oxide nanoparticles in an aliphatic or aromatic hydrocarbon (boiling point≧100° C.) and the crosslinker initially, to heat to 50–95° C., then to add the monomeric alkyleneimine with thorough stirring and to stir the mixture at that temperature for from 4 to 24 h in general until the test for alkyleneimine is negative.

Finally, variant b) comprises coupling the modifying of the metal oxide nanoparticles with their production via a sol-gel process, either again in the presence of a crosslinked or uncrosslinked polyalkylenepolyamine (variant b1)) or in the presence of the monomeric alkyleneimine and, if desired, of the crosslinker (variant b2)).

The metal oxide nanoparticles are advantageously synthesized according to the sol-gel process described in J. Colloid Interf. Sci. 26, 62 (1968) by hydrolysis of organic esters of the metal acids (eg. tetraalkoxyorthosilicates wherein the alkoxy radicals have from 1 to 5, preferably from 1 to 3, especially 2, carbon atoms) in an aqueous alcoholic medium in the presence of a basic catalyst, especially ammonia. It is customary to use $C_1$–$C_4$-alkanols such as methanol, ethanol, isopropanol or butanol here, ethanol being preferred.

Variant b1) is advantageously carried out by heating an alcoholic aqueous solution of ammonia to about 30–60° C. and rapidly adding in succession the organic metal acid ester and the crosslinked or uncrosslinked polyalkylenepolyamine (preferably as as a 1–99% strength by weight, heated or unheated alcoholic solution). Following a reaction time of generally from 2 to 8 h, especially from 4 to 6 h, at the selected temperature, the suspension is cooled to room temperature for example, and the modified metal oxide nanoparticles are filtered off, washed pH-neutral and dried, for example at from 60 to 80° C. in a vacuum drying cabinet.

This procedure provides spherical metal oxide nanoparticles which are useful for producing composite pigments and whose particle size, as already mentioned above, is advantageously controllable via the molecular weight of the polyalkylenepolyamine used.

Variant b2) can be carried out similarly to variant b1), except that generally an alcoholic aqueous (from about 5 to 99% strength by weight) solution or suspension of the monomeric alkyleneimine and optionally of the crosslinker is added and the reaction suspension is adjusted to a pH of about 8 and then stirred for about 1–5 days until the test for alkyleneimine is negative.

The composite pigments of the invention are very useful for all customary pigment applications because of their good application properties, especially the absence of bleeding from products colored therewith. Examples of materials which are suitable for coloring include paints, inks, especially aqueous inkjet inks, plastic, paper, wood, leather and textile materials.

EXAMPLES

A) Production of silicon dioxide nanoparticles modified according to the invention Examples 1 to 4

A mixture of 222.5 g of 25% strength by weight aqueous ammonia, 1428 g of water and 1428 g of 96% strength by weight aqueous ethanol was heated to 50° C. with stirring. The mixture was then rapidly mixed with first 303.6 g of tetraethoxysilane (98% pure; calc. 100%) and then a mixture, heated to 40° C., of 150 g of 22.3% strength by weight aqueous polyethyleneimine and 777.6 g of ethanol. The suspension was subsequently stirred at 50° C. for 5 h.

After cooling to room temperature, the polyethyleneimine-modified $SiO_2$ nanoparticles were filtered off, washed with water and dried at 80° C. in a vacuum drying cabinet.

Further details of these experiments and their results are summarized in Table 1.

TABLE 1

| Ex. | Polyethyleneimine average molecular weight | proportion of secondary N atoms (2° N.) | Particle size range of modified $SiO_2$ nanoparticles |
|---|---|---|---|
| 1 | 800 | 35% | 200–460 nm |
| 2 | 2 000 | 35% | 150–300 nm |
| 3 | 25 000 | 38% | 20–30 nm |
| 4 | 1 000 000 | 38% | 20–30 nm |

Example 5

Example 1 was repeated, except that the modifier used was a polyethyleneimine (average molecular weight 1000000; 2° N: 38%) crosslinked by polyethylene glycol bisglycidyl ether (average molecular weight: 1500) and having a viscosity of 14 mPas (20% strength by weight aqueous solution, 200C, Brookfield method).

Modified $SiO_2$ nanoparticles from 20 to 30 nm in size were obtained.

Example 6

Example 1 was repeated, except that a mixture of 34 g of ethyleneimine, 122 g of water and 77.6 g of ethanol was added as modifier and the reaction suspension was stirred for 5 d until the test for ethyleneimine was negative.

A workup similar to Example 1 afforded polyethyleneimine-modified $SiO_2$ nanoparticles having an average particle size of 120 nm.

Example 7

5 g of ethyleneimine were added to a suspension of 10 g of $SiO_2$ nanoparticles (average particle size 80 nm, BET surface area 50 $m^2/g$) at room temperature with thorough stirring. The suspension was then heated to 50° C. over 2 h and stirred for 5 d while gradually raising the temperature to 80–90° C. until the test for ethyleneimine was negative.

A workup similar to Example 1 afforded polyethyleneimine-modified $SiO_2$ nanoparticles having an average particle size of 80 nm.

Example 8

A mixture of 10 g of $SiO_2$ nanoparticles (average particle size 120 nm, BET surface area 25 $m^2/g$), 100 g of octane and 0.57 g of 1,2-dichloroethane was heated to 80° C. with thorough stirring. 10 g of ethyleneimine were then added. The suspension was stirred at that temperature for 24 h until the test for ethyleneimine was negative.

A workup similar to Example 1 afforded polyethyleneimine-modified $SiO_2$ nanoparticles having an average particle size of 120 nm.

Example 9

A suspension of 8 g of $SiO_2$ nanoparticles (average particle size 15 nm, BET surface area 200 $m^2/g$) in 800 g of water was heated to 65° C. with stirring. 55.6 g of a 2.5% strength by weight aqueous solution of the crosslinked polyethyleneimine of Example 5 were then added dropwise.

Subsequent stirring at 65° C. for 2 hours and a workup similar to Example 1 afforded modified $SiO_2$ nanoparticles having an average particle size of 15 nm.

B) Production of composite pigments according to the invention

The following anionic reactive dyes were used in the production of the composite pigments:

Dye 1 (blue)

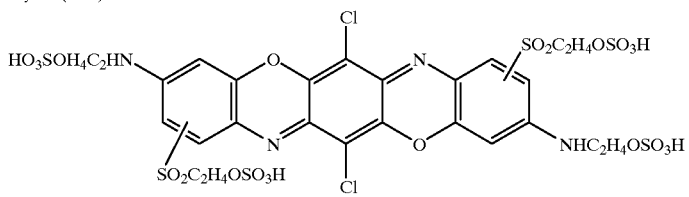

Dye 2 (yellow)

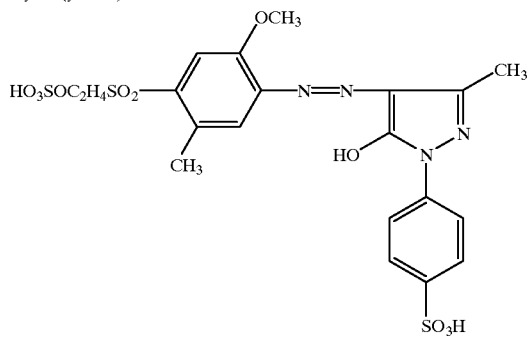

Dye 3 (red)

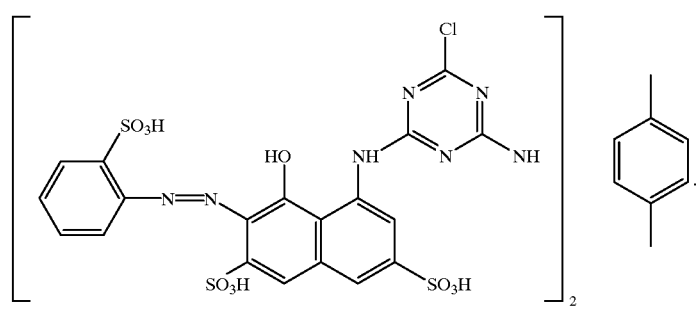

Examples 10 to 14 xg of a 1% strength by weight aqueous suspension of the modified SiO$_2$ nanoparticles of Example 9 (in Example 14, the modified SiO$_2$ nanoparticles of Example 9 were not intermediarily isolated) were adjusted to pH 3.1 by addition of a concentrated acetic acid and then heated to 65° C. with stirring. After stirring at that temperature for 1 hour, y g of a 3% strength by weight aqueous solution of an anionic reactive dye were added dropwise. Thereafter the suspension was heated to the reflux temperature and stirred at that temperature for a further 3 h.

After cooling down to room temperature, the composite pigments formed were filtered off, washed with water, dried at 80° C. in a vacuum drying cabinet and ground.

In all cases the products obtained were strong pigments having excellent resistance to bleeding when used for coloring PVC and fastness to overcoating when used for coloring sheet metal paint.

Further details of these experiments are summarized in Table 2.

TABLE 2

| Ex. | x g of suspension of mod. SiO$_2$ nanoparticles | y g | of dye solution |
|---|---|---|---|
| 9 | 400 | 43.2 | Dye No. 1 |
| 10 | 500 | 55.6 | Dye No. 2 |
| 11 | 500 | 41.7 | Dye No. 3 |
| 12 | 400 | 29.3 | Dye No. 4 |
| 14 | 560 | 140 | Dye No. 3 |

We claim:

1. Composite pigments comprising nanoparticulate metal oxides modified by crosslinked or uncrosslinked polyalkylenepolyamine and anionic dyes.

2. Composite pigments as claimed in claim 1, wherein the nanoparticulate metal oxides comprise silicon dioxide.

3. Composite pigments as claimed in claim 1, wherein the nanoparticulate metal oxide are modified by polyethyleneimine optionally crosslinked by 1,2-dichloroethane, epichlorohydrin or reaction products of polyethylene glycols with epichlorohydrin.

4. Composite pigments as claimed in claim 1, wherein the polyalkylenepolyamine has a secondary nitrogen atom content of from 20 to 60% and an average molecular weight of from 100 to 10,000,000.

5. Composite pigments as claimed in claim 1, wherein the nanoparticulate metal oxides and crosslinked or uncrosslinked polyalkylenepolyamine are present in a weight ratio within the range from 1000:1 to 1:10 by weight respectively.

6. Composite pigments as claimed in claim 1, comprising anionic reactive dyes.

7. Composite pigments as claimed in claim 1, wherein the metal oxides are silicon dioxide, aluminum oxide, zirconium dioxide, titanium dioxide or tin dioxide.

8. Composite pigments as claimed in claim 1, wherein the anionic dyes are azo dyes, di- or triarylmethane dyes, anthraquinone dyes, phthalocyanine dyes, nitro dyes, pyrazolone dyes, quinoline dyes, naphthol dyes or azine dyes.

9. Composite pigments as claimed in claim 7, wherein the anionic dyes are azo dyes, di- or triarylmethane dyes, anthraquinone dyes, phthalocyanine dyes, nitro dyes, pyrazolone dyes, quinoline dyes, naphthol dyes or azine dyes.

10. Composite pigments as claimed in claim 9, wherein the metal oxides are silicon dioxide.

11. A method of coloring paints, inks, plastic, paper, wood, leather and textile materials, which comprises incorporating the composite pigments as claimed in claim 1 in a coloring effective amount into said paints, inks, plastic, paper, wood, leather and textile materials.

12. A process for producing composite pigments comprising nanoparticulate metal oxides modified by crosslinked or uncrosslinked polyalkylenepolyamine and anionic dyes, which comprises adjusting an aqueous suspension of nanoparticulate metal oxides modified by crosslinked or uncrosslinked polyalkylenepolyamine to a pH within a range of from 3 to 6 and heating to rot more than 100° C. for from 1 to 3 h, then adding an aqueous solution of the anionic dye, cooling the mixture after a reaction time of from 1 to 24 h at from 20 to 100° C. and isolating the resulting composite pigment and followed by an optional drying and grinding.

13. A process for producing composite pigments comprising nanoparticulate metal oxides modified by crosslinked or uncrosslinked polyalkylenepolyamine and anionic dyes which comprises adjusting an aqueous suspension of nanoparticulate metal oxides modified by crosslinked or uncrosslinked polyalkylenepolyamine to a pH within a range of from 3 to 6 and heating to not more than 100° C. for from 1 to 3 h, then adding an aqueous solution of the anionic dye, cooling the mixture after a reaction time of from 1 to 24 h at from 20 to 100° C.

14. Metal oxide nanoparticles of aluminum oxide, zirconium dioxide, titanium dioxide or tin dioxide modified by crosslinked or uncrosslinked polyalkylenepolyamine.

15. A process for producing metal oxide nanoparticles of aluminum oxide zirconium dioxide, titanium dioxide or tin dioxide modified by crosslinked or uncrosslinked polyalkylenepolyamine, which comprises

- a1) heating an aqueous suspension of the metal oxide nanoparticles together with an aqueous solution of the crosslinked or uncrosslinked polyalkylenepolyamine, or
- a2) heating a suspension of the metal oxide nanoparticles in water or in an inert organic solvent together with monomeric alkyleneimine and, optionally a crosslinker to polymerize the alkyleneimine to the polyalkylenepolyamine, or
- b) preparing the metal oxide nanoparticles in situ via a sol-gel process; by hydrolysis of organic esters of the metal acids
- b1) in the presence of the crosslinked or uncrosslinked polyalkylenepolyamine, or
- b2) in the presence of a monomeric alkyleneimine and, optionally, a crosslinker and polymerizing the alkyleneimine to the polyalkylenepolyamine.

* * * * *